United States Patent
Gehring et al.

(10) Patent No.: US 7,189,046 B2
(45) Date of Patent: Mar. 13, 2007

(54) TRANSPORT FOR SWAP BODY

(75) Inventors: Ottmar Gehring, Kernen (DE); Harro Heilmann, Ostfildern (DE); Andreas Schwarzhaupt, Landau (DE); Gernot Spiegelberg, Heimsheim (DE); Armin Sulzmann, Oftersheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/963,784

(22) Filed: Oct. 14, 2004

(65) Prior Publication Data

US 2005/0135909 A1   Jun. 23, 2005

(30) Foreign Application Priority Data

Oct. 14, 2003   (DE) .................. 103 47 564

(51) Int. Cl.
  *B65G 25/00*   (2006.01)
  *B66C 17/08*   (2006.01)
  *G06F 7/00*   (2006.01)

(52) U.S. Cl. .............. 414/198; 414/498; 414/495; 700/213

(58) Field of Classification Search .......... 414/198, 414/498, 495, 537, 460, 549; 700/213
  See application file for complete search history.

(56) References Cited

U.S. PATENT DOCUMENTS

| | | | | |
|---|---|---|---|---|
| 3,460,697 A | * | 8/1969 | Cowlishaw et al. | ........ 414/498 |
| 3,632,072 A | * | 1/1972 | Blackburn | ........ 248/150 |
| 4,053,073 A | * | 10/1977 | Franchin | ........ 414/495 |
| 4,640,657 A | * | 2/1987 | Moore et al. | ........ 414/347 |
| 4,777,798 A | * | 10/1988 | Jacobson et al. | ........ 60/428 |
| 4,903,946 A | * | 2/1990 | Stark | ........ 254/45 |
| 4,943,193 A | * | 7/1990 | Koskinen et al. | ........ 410/69 |
| 5,176,391 A | * | 1/1993 | Schneider et al. | ........ 280/6.153 |
| 5,208,753 A | * | 5/1993 | Acuff | ........ 701/50 |
| 5,562,390 A | * | 10/1996 | Christenson | ........ 414/477 |
| 5,624,225 A | * | 4/1997 | Cox | ........ 414/495 |
| 5,829,947 A | * | 11/1998 | Litten | ........ 414/537 |
| 5,913,525 A | * | 6/1999 | Schneider et al. | ........ 280/6.153 |
| 6,267,041 B1 | * | 7/2001 | Skiba et al. | ........ 91/436 |
| 6,267,432 B1 | * | 7/2001 | Stolle | ........ 296/107.01 |
| 6,546,312 B1 | * | 4/2003 | Matsumoto | ........ 700/213 |
| 6,665,601 B1 | * | 12/2003 | Nielsen | ........ 701/50 |
| 6,848,693 B2 | * | 2/2005 | Schneider | ........ 280/6.153 |
| 2002/0003996 A1 | * | 1/2002 | Lim et al. | ........ 414/498 |
| 2003/0077157 A1 | * | 4/2003 | Smith et al. | ........ 414/491 |

FOREIGN PATENT DOCUMENTS

DE   42 23 951 A1   1/1994

(Continued)

*Primary Examiner*—Eileen D. Lillis
*Assistant Examiner*—Gregory Adams
(74) *Attorney, Agent, or Firm*—Norman N. Kunitz; Fitch, Even, Tabin & Flannery

(57) ABSTRACT

A transport (1) or an associated trailer (2) with a loadable swap body (3, 4) having a support frame and support legs (5) attached to the frame and moveable between a resting position and a support position wherein that the swap body (3, 4) can be set on the ground without the transport/trailer. At least one support leg (5) is allocated an element (6, 16) for automatically moving the support leg (5) from the resting position into the support position and/or vice versa. A control device (8, 10, 11) disposed on the transport/trailer (1, 2) transmits a control signal to an actuating element (17, 18, 19, 20), secured to the transport/trailer (1, 2), that cooperates with the support leg (5) to move the leg into the support or resting position, and the control device (8, 10, 11) is connected to at least one further locking actuator for determining whether the swap body (3, 4) is secured to the transport during travel.

13 Claims, 1 Drawing Sheet

FOREIGN PATENT DOCUMENTS

| | | |
|---|---|---|
| DE | 296 08 492 U1 | 9/1996 |
| DE | 196 07 945 C2 | 11/1999 |
| DE | 195 26 702 C2 | 8/2001 |
| DE | 698 09 858 T2 | 11/2003 |
| EP | 900692 A1 * | 3/1999 |

* cited by examiner

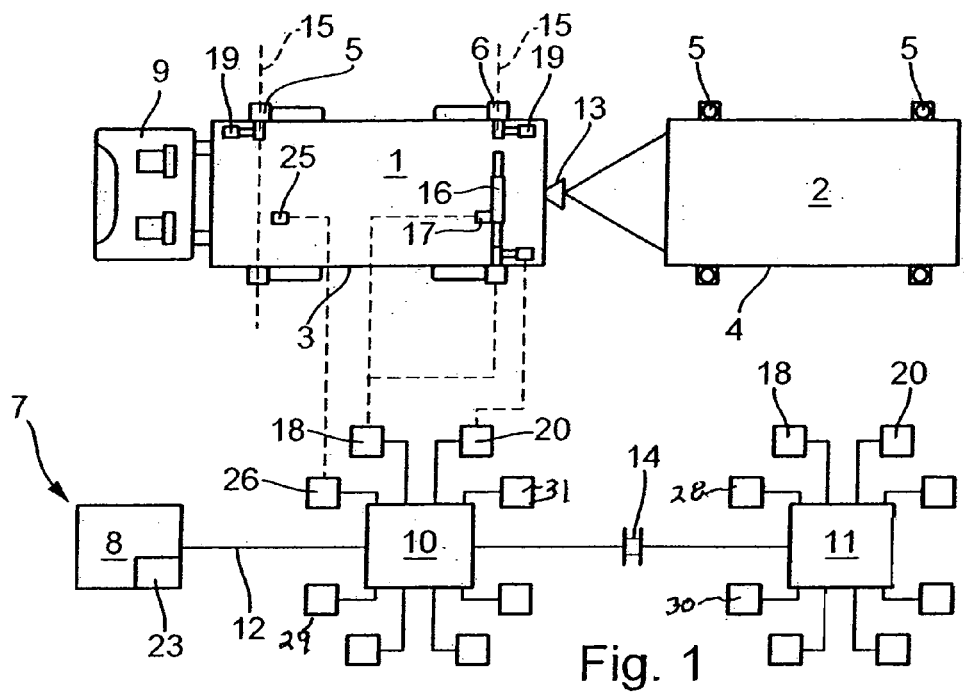
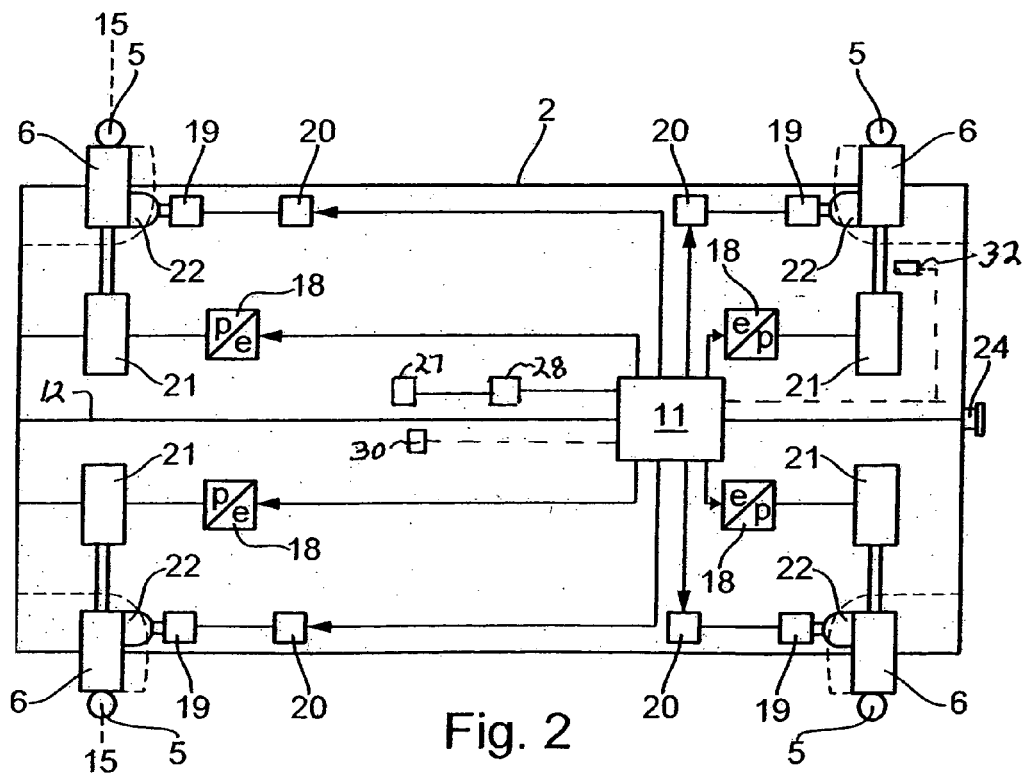

TRANSPORT FOR SWAP BODY

CROSS REFERENCE TO RELATED APPLICATION

This application claims the priority of German Patent Application No. 103 47 564.8-24, filed on Oct. 14, 2003, the subject matter of which, in its entirety, is incorporated herein by reference.

FIELD OF THE INVENTION

The invention relates to a transport or an associated trailer with an actuating arrangement for actuating a loadable swap body or interchangeable unit that has a support frame and support legs that are secured to the frame and can be lifted from the ground and moved into a resting position, and can be moved into contact with the groove in a support position, so that the swap body can be placed on the ground without the transport or trailer, and wherein an element being allocated to at least one support leg for automatically moving the support leg from the resting position into the support position, and/or vice versa.

BACKGROUND OF THE INVENTION

The term transport encompasses trucks, tractor vehicles with beds or tractor vehicles with separate trailers, including vehicles with trailers or beds, that are suited for receiving a swap body.

German utility model document DE 296 08 492 U1 discloses a swap body that is to be mounted onto a vehicle chassis. The swap body is provided with hydraulic supports, which raise and lower it. Each hydraulic support is allocated one of the corner regions of the support frame of the swap body, and can be moved by a hydraulic cylinder from a resting position, when the supports are not in use, into a support position when the supports are in operation. The support legs of the swap body are moved horizontally outward from the support frame of the swap body, then extended by the hydraulic cylinder, so the support frame of the swap body can be moved perpendicular to the ground.

German Published Application No. DE 422 39 51 A1 discloses a hinging mechanism, with which the support legs of a swap body can be moved from the resting position into the support position. The support leg is moved horizontally outward from the resting position, and is supported on the ground or floor through a rotation about the horizontal axis. The special restricted guidance of the support shaft in connection with a mechanical drive permits the movement of the supports to be executed completely automatically. The sequential operation of the support-leg movement is effected as follows: The legs are unlocked and extended laterally in the direction of the support shaft guided in the bearing tube; the legs are folded down into the vertical support position; and the struts are unfolded and locked in counterbearings on the floor of the container of the swap body, which secures the supports in the longitudinal and transverse directions of the container. Afterward, a locking mechanism on the vehicle side of the support point is unlocked through the rotational and lowering movement of the locking pin (Twistlock). During the mechanical movement, the transmission of force from the vehicle to the support legs of the swap body is effected by a driven driving tab on the side of the vehicle, the tab extending into the underside of the container and moving either the support shaft in the transverse direction of the container or the strut counterbearing in the longitudinal and transverse direction of the container. In the hydraulic/pneumatic, container-side drive configuration, a pressure/traction cylinder is provided with an automatic compound valve, which supplies the cylinder with the necessary pressure when the vehicle receives the swap body.

German Patent No. DE 196 07 945 C2 discloses an interchangeable container or swap body that has support legs. In this instance, the support legs can be rotated by 90 degrees about a bearing tube from a resting position into the support position. A transport or the associated trailer is driven beneath the supported swap body or interchangeable container and the vehicle frame is extended upward by the pneumatic cushioning in order to raise the swap body, with the support legs, from the ground so that the support legs can be transferred into the resting position. A pneumatic thrust cylinder extends into a groove in the support leg and moves the leg horizontally outward. The drive is secured to the vehicle frame, and may comprise, for example, four thrust cylinders or an electrical drive for transferring the support legs into the support position. No actuation for automatically actuating the support legs of the swap body, insofar that it relates to the transport, is shown.

German Patent Document No. DE 698 09 858 T2 illustrates the mechanical structure of a swap body, but little reference is made to the transport. In particular, information about the electronic equipment of the transport is lacking. The document discloses the control of a cylinder by a system of electric valves. Each electric valve can be remotely controlled by a control console. No extensive disclosure of the electrical equipment of the transport is presented.

German Patent No. DE 195 26 702 C2 centers on the task of maneuvering a truck with a trailer backward beneath a swap body or interchangeable container. To this end, the trailer has a camera that records the support legs of the swap body to help maneuver the trailer between the support legs. A control device is provided in the tractor vehicle. The loading of the swap body and the actuation of the support legs are of no significance here.

SUMMARY OF THE INVENTION

It is the object of the present invention to modify a transport or an associated trailer for a swap body such that it is possible to actuate a standardized swap body automatically, thereby improving the actuation of the drive for moving the support legs.

This object generally is achieved according to the present invention in that a control device is disposed on the transport or trailer and transmits a control signal to an actuating element secured to the transport or trailer, causing the actuating element to cooperate with the support leg on the swap body to bring the leg into the support position or resting position. The control device is connected to an electrically actuatable actuator, which is an electrically actuatable valve of a thrust cylinder or traction cylinder, or is an electric motor, and the control device is connected to at least one further locking actuator for securing the swap body to the transport during travel.

With the invention, it is acknowledged that the use of a special electronics architecture can significantly improve the changing of the swap body into the support position and the detachment of the swap body from the transport or its trailer. A prerequisite for the general applicability of the invention is that no modifications to the standardized swap bodys are necessary. Instead, the invention focuses exclusively on the transport or the associated trailer. The solution in accordance with the invention improves the transport such that the loading or unloading of the swap body can be initiated from the vehicle cab or by a remote control in a wired or wireless electrical connection to the transport. To this end, a control device that is networked with further control devices via a data bus system is provided in the transport or trailer. In particular, a control device in the trailer is electrically connected via a data bus to the control devices in the tractor vehicle for actuating an actuating element that can move the support legs of the swap body. The control device is disposed in the transport or trailer such that electrical lines lead from the device in a star formation, the lines supplying the actuators with electrical current or data. The actuators, which may be electric motors, for example, serve as actuating elements for moving the support legs, or are connected to an actuating element for moving the support legs, as is the case with, for example, an electric valve as the actuator and a pneumatic thrust cylinder as the actuating element.

The electronic architecture in the transport includes at least one control-signal receiver, which receives the signal for moving the support legs into the support position or the resting position either from the vehicle cab or via the remote control. The status of the respective support legs can be displayed in the driver's cab of the tractor vehicle, and supplemented by, for example, a camera image for illustrating the surroundings of the support legs. The start signal for moving the support legs is transmitted, for example, via a CAN data bus to a first control device in the tractor vehicle, and from there via a data bus or electrical line to the actuators that actuate the actuating elements for moving the support legs. An additional data bus can also carry the signal to a trailer for further processing by a control device there, and for activating the actuators there for actuating the actuating element for a respective support leg.

In a modification of the invention, the driver is provided with a remote-control device, which he takes with him when he stands next to a support leg and which operates to move the leg from the resting position into the support position. Likewise, the driver can use the remote-control device to move the support leg into the resting position.

According to a feature of the invention, a sensor that is electrically connected to the control device detects whether the swap body is secured to the transport or trailer, or whether the support legs are secured in the resting position. The control device is connected to a display in the driver's cab of the transport for indicating the respective position. The transport can be provided with sensors and an associated display device, which indicates the position of the support legs and, most importantly, the secure locking of the support legs while the transport travels. The display may, however, only appear if the support legs are not securely latched in the resting position. A further display may be provided for depicting the latching of locking actuators, or indicating an error in the latching procedure when the transport initiates travel with the swap body. This assures a particularly reliable, automated operation of the transport with a swap body.

In an especially preferred modification of the invention, the actuating element is formed so as to permit both a horizontal movement of a support leg of the swap body from the resting position and the pivoting of this support leg from a horizontal position into a vertical support position. The actuating element on the transport can additionally support the automatic return of the support leg into the resting position. For this purpose, the actuating element can be a shaft that is driven by an electric motor and engages a further shaft in the region of the support leg on the swap body, so the rotational movement of the shaft moves the support leg into the horizontal position, where it can subsequently be latched in the resting position by a thrust or traction cylinder.

There are various, advantageous ways of embodying and modifying the teaching of the present invention, as outlined in the dependent claims and the ensuing description of an embodiment. The drawings illustrate an embodiment of the transport in accordance with the invention.

BRIEF DESCRIPTION OF THE DRAWINGS

FIG. 1 is a schematic illustration of a truck having a trailer for a mounted swap body and the associated control-device architecture.

FIG. 2 is a detailed schematic view of the control-device architecture of the transport or trailer of FIG. 1.

DETAILED DESCRIPTION OF THE INVENTION

The transport comprises a tractor vehicle 1 and the associated trailer 2, each having a mounted swap body 3 and 4, respectively. Each swap body 3, 4 has four support legs 5, which, in FIG. 1, are shown resting laterally against swap body 3 in the resting position and standing firmly on the ground in the support position in the case of trailer 2 and swap body 4. In the support position, swap body 4 can be placed on the ground when the pneumatic cushioning or suspension of the trailer 2 lowers the trailer by releasing compressed air, so that swap body 4 comes to rest on the ground via the supporting legs 5.

Each support leg 5 is allocated a support-leg mechanism 6, which can be employed to move the respective support leg 5 from the resting position into the support position and vice versa. Support mechanism 6 is actuated by way of an electronic network 7, which includes a central control device 8 disposed in the driver's cab 9 of tractor vehicle 1, a further control device 10 disposed in the rear region of tractor vehicle 1 and a control device 11 disposed in trailer 2. Control devices 8, 10 and 11 are networked with one another via a data bus 12, for example, a CAN data bus. In the region of the trailer hitch 13, the position of data bus 12 connected to control device 11 of the trailer 2 is connected to control device 8 and control device 10 of tractor vehicle 1 by, for example, a plug 14 or a wireless data-bus connection.

In the resting position, support legs 5 rest laterally against swap body 3. Support mechanism 6 moves the support legs 5 horizontally outward from a secured resting position, then pivots them into the support position through a rotational movement about the axis 15. A pneumatic or hydraulic thrust cylinder 16 effects the horizontal movement, and its control valves 17 are electromechanically actuated by an electric actuator 18, which is in turn controlled by control device 10. A shaft that can be actuated by respective electric motors 19 is disposed at each rotational axis 15, and serves in pivoting support legs 5 from the resting position into the support position and vice versa. Control device 10 also actuates electric motor 19 via an actuator 20. Network 7 is configured such that support legs 5 can be pivoted completely automatically into the support position and back into the resting position. Thus, swap body 3 or 4 is automatically placed on the ground by the electronic control components.

FIG. 2 is a detailed representation of network 7 of trailer 2. Control device 11 is connected in a star formation to the individual actuators that are secured to trailer 2. In addition to respective support mechanisms 6 for the individual legs 5, four thrust cylinders 21 are provided there for correspondingly actuating a respective support leg 5 to move horizontally. Control device 11 actuates the valves of respective thrust cylinders 21 by way of respective electropneumatic actuators 19. Control device 11 actuates the respective electric motors 19, each of which acts on a respective shaft of a respective support leg 5 via an actuator 20 and a gear 22 for pivoting each support leg 5 about a respective axis 15. A remote control arrangement 23 is provided for the central control device 8, which can then be actuated wirelessly by the remote control device from the driver's cab 9 of tractor vehicle 1, or by use of a switch 24 on trailer 2 or on tractor vehicle 1. Consequently, the driver can stand next to trailer 2 with the remote control device, for example, while he lowers support legs 5 to the ground. A camera in the driver's cab 9 can also be used to initiate the pivoting of the support legs 5. Finally, the swap body 3, 4 can be actuated by a wired connection with the help of operating button 24.

Control device 10 uses a further electrical actuator 26 to control a locking actuator 25, which secures the wap body 3 to tractor vehicle 1 when the tractor vehicle 1 is being driven. A similar additional actuator-latch arrangement 27, 28 (FIG. 2) may be provided on the trailer 2 and connected to control device 11. Moreover, in order to be able to automatically and remotely determine the status of the latch 25 or 27, i.e., whether engaged or not, and of the legs 5, various sensors are provided. For example, sensors 29, 30 connected to the control units 10 and 11, respectively, are provided for the latches 25 and 27, respectively, to provide an indication or display, for example, in the cab 9, whether the latches are engaged prior to movement of the tractor 1 or trailer 2. Moreover, sensors 31 and 32 connected to the control units 10 and 11, respectively, may be provided to monitor the status, whether in a rest or support position, of at least one of the legs 5 of the tractor 1 and/or trailer 2, respectively, and provide a similar indication or display. It is of course understood that although only one sensor 31 or 32 for monitoring the status of only one leg of the tractor or trailer has been shown, that additional sensors for each of the legs may be provided.

Network 7 thus permits swap body 3, 4 to be mounted and lowered completely automatically, so the driver may stand next to the transport with the remote control merely to observe the procedure. A fully-automatic swap body mounting system is particularly suited for fully-automatic loading and unloading of cargo in large logistic operations.

It will be appreciated that the above description of the present invention is susceptible to various modifications, changes and adaptations, and the same are intended to be comprehended within the meaning and range of equivalents of the appended claims.

What is claimed is:

1. Apparatus comprising: a tractor vehicle having an associated trailer, an actuation device for actuating a loadable swap body having a support frame and support legs that are attached to the frame and that can be raised from the ground into a resting position, and can be moved into a support position wherein the swap body can be set on the ground and supported by the legs without the tractor vehicle or the trailer, with said support legs being provided with associated actuating elements for automatically moving the support legs from the resting position into the support position and vice versa;
   a respective control device disposed on the tractor vehicle and on the trailer, with each control device transmitting a control signal to an actuating element secured to the associated tractor vehicle or the trailer, so that the actuating element cooperates with the associated support leg on the swap body to move the leg into the support position or the resting position, with the actuating elements being an electrically actuatable actuator that is one of an electrically actuatable valve of a thrust or traction cylinder, and an electric motor;
   at least one of the control devices is connected to at least one further locking actuator for securing the swap body to the associated transport or trailer during travel;
   said control device disposed on the trailer being electrically connected, via a data bus and a bus connection between a portion of the bus on the tractor vehicle and a portion of the bus on the trailer, to the control device on the tractor vehicle for actuating one of the actuating elements;
   each control device is disposed on the associated tractor vehicle or the trailer such that electrical lines lead from the respective control devices for supplying the associated actuators with electrical current or data, and the control signal can be transmitted from the control device of the tractor vehicle to the trailer via the data bus for further processing by the connected control device disposed on the trailer for activating the associated activating elements on the trailer for respective support legs of an associated swap body;
   sensor means electrically connected to one of the control devices for detecting both whether an associated locking actuator has secured the swap body to the associated tractor vehicle or the trailer and whether the support legs are secured in the resting position, and for providing an indication of the position of the support legs and the secure locking of the locking actuator during the travel of the tractor vehicle and,
   at least one further control device is connected to a display in the driver's cab of the transport for displaying the conditions detected by the sensor means.

2. The apparatus according to claim 1, wherein the electrical lines lead from the respective control devices in a star formation for supplying the associated actuators with electrical current or data.

3. The apparatus according to claim 1 wherein the bus connection is a plug connection.

4. Apparatus comprising: a transport having an associated trailer, a loadable swap body having a support frame and support legs that are attached to the frame and that can be raised from the ground into a resting position, and can be moved into a support position wherein the swap body can be set on the ground and supported by the support legs without the transport or the trailer, with said support legs being provided with associated actuating means for automatically moving the support legs from the resting position into the support position and vice versa in response to a control signal;
   a respective control device disposed on the transport and on the trailer, with each control device transmitting a control signal to the actuating means secured to the associated transport or the trailer, to cause the actuating means to cooperate with the associated support leg on the swap body to move the leg into the support position or the resting position, with the actuating means being an electrically actuatable actuator that is one of an electrically actuatable valve of a thrust or traction cylinder, and an electric motor;
   at least one of the control devices is connected to at least one further locking actuator for securing the swap body to the associated transport or trailer during travel;
   said control device disposed on the trailer is electrically connected, via a data bus and a bus connection between a portion of the bus on the transport and a portion of the bus on the trailer, to the control device on the transport for actuating one of the actuating means;

each control device is disposed on the associated transport or the trailer such that electrical lines lead from the respective control devices for supplying the associated actuating means with electrical current or data, and the control signal can be transmitted from the control device of the transport to the trailer via the data bus for further processing by the connected control device disposed on the trailer for activating the associated actuating means on the trailer for the respective support legs of an associated swap body;

sensor means electrically connected to one of the control devices at least one of whether an associated locking actuator has secured the swap body to the associated transport or the trailer, and whether the support legs are secured in the resting position, and for providing an indication of the position of the support legs and the secure locking of the locking actuator during the travel of the transport; and, at least one further control device is connected to a display in the driver's cab of the transport for displaying the conditions detected by the sensor means.

5. The apparatus according to claim 4, wherein the sensor means that is electrically connected to the control device detects both whether the locking actuator has secured the swap body to the associated transport or the trailer, and whether the support legs are secured in the resting position.

6. The apparatus according to claim 4, wherein each control device on the transport and trailer is connected to a receiver for an actuating signal from a remote control for initiating the movement of the support legs.

7. The actuator according to claim 4, wherein the actuating element is secured to the associated transport or trailer, and effects an initial horizontal movement of a support leg of the swap body from its resting position, followed by rotational and vertical movement to the support position.

8. The apparatus according to claim 4, wherein an actuating element supports the automatic return of the support leg from the support position into the resting position.

9. The apparatus according to claim 4, wherein the electrical lines lead from the respective control devices in a star formation for supplying the associated actuators with electrical current or data.

10. The apparatus according to claim 4 wherein the bus connection is a plug connection.

11. Apparatus comprising: a transport having an associated trailer, a loadable swap body having a support frame and support legs that are attached to the frame and that can be raised from the ground into a resting position, and can be moved into a support position wherein the legs touch the ground so that the swap body can be set on the ground and supported by the legs without the transport or the trailer, with said support legs being provided with associated actuating elements for automatically moving the support legs from the resting position into the support position and vice versa;

a respective control device disposed on the transport and on the trailer, with each control device transmitting a control signal to an actuating element secured to the associated transport or the trailer, so that the actuating element cooperates with the associated support leg on the swap body to move the leg into the support position or the resting position, with the actuating elements being an electrically actuatable actuator that is one of an electrically actuatable valve of a thrust or traction cylinder, and an electric motor;

at least one of the control devices is connected to at least one further locking actuator for securing the swap body to the associated transport or trailer during travel;

said control device disposed on the trailer being electrically connected, via a data bus and a bus connection between a portion of the bus on the transport and a portion of the bus on the trailer, to the control device on the transport for actuating one of the actuating elements;

each control device is disposed in the associated transport or the trailer such that electrical lines lead from the respective control devices for supplying the associated actuating elements with electrical current or data, and the control signal can be transmitted from the control device of the transport to the trailer via the data bus for further processing by the connected control device disposed on the trailer for activating the associated actuating elements on the trailer for the respective support legs of an associated swap body;

sensor means electrically connected to one of the control devices for detecting both whether an associated locking actuator has secured the swap body to the associated transport or the trailer, and whether the support legs are secured in the resting position, and for providing an indication of the position of the support legs and the secure locking of the locking actuator during the travel of the transport; and, the control device disposed on the trailer is networked with the transport via the data bus for actuating the actuating elements on the trailer based on a signal originating from a control device located in the driver's cab or a remote control.

12. The apparatus according to claim 11, wherein the electrical lines lead from the respective control devices in a star formation for supplying the associated actuators with electrical current or data.

13. The apparatus according to claim 11 wherein the bus connection is a plug connection.

* * * * *